(12) United States Patent
Stephan et al.

(10) Patent No.: US 6,378,805 B1
(45) Date of Patent: Apr. 30, 2002

(54) PRESSURE FRAME DESIGNED IN PARTICULAR FOR AN AIRCRAFT

(75) Inventors: Walter Stephan, St. Martin; Hermann Filsegger, Ried im Innkreis, both of (AT)

(73) Assignee: Fischer Advanced Composite Components AG, Ried im Innkreis (AT)

( * ) Notice: Subject to any disclaimer, the term of this patent is extended or adjusted under 35 U.S.C. 154(b) by 0 days.

(21) Appl. No.: 09/530,582
(22) PCT Filed: Nov. 3, 1998
(86) PCT No.: PCT/AT98/00271
 § 371 Date: May 9, 2000
 § 102(e) Date: May 9, 2000
(87) PCT Pub. No.: WO99/24316
 PCT Pub. Date: May 20, 1999

(30) Foreign Application Priority Data

Nov. 10, 1997 (AT) .............................................. 1903/97

(51) Int. Cl.[7] .................................................. B64C 1/10
(52) U.S. Cl. .................................... 244/119; 244/117 R
(58) Field of Search ................................. 244/119, 117, 244/117 R

(56) References Cited

U.S. PATENT DOCUMENTS 4,296,869 A * 10/1981 Jawad ............................ 220/3
5,062,589 A * 11/1991 Roth et al. ................... 244/117

* cited by examiner

Primary Examiner—Peter M. Poon
Assistant Examiner—Tim D. Collins
(74) Attorney, Agent, or Firm—Jacobson Holman, PLLC

(57) ABSTRACT

A pressure frame, designed in particular for an aircraft, including a dome-shaped cover made of composite materials reinforced with fibers, preferably in one single piece, and cover reinforcing devices connected to the cover or produced integrally therewith. To reduce weight and cost while still fulfilling strain requirements, particularly of large aircraft, and to reduce the risk of destruction due to the cover being turned inside out towards the inside of the aircraft, the cover is of essentially uniform thickness and includes at least one cover reinforcing device which is mounted in the central area on the concave side of the cover. Advantageously, this cover reinforcing device in the central area is formed by a reinforcing structure oriented against the curvature of the cover, such as at truncated cone-shaped, mug-shaped or parabolic structure, with a cavity being arranged between the cover and the reinforcing structure.

17 Claims, 7 Drawing Sheets

Detail A

Detail B

PRESSURE FRAME DESIGNED IN PARTICULAR FOR AN AIRCRAFT

BACKGROUND OF THE INVENTION

1. Field of the Invention

The invention relates to a pressure frame, designed in particular for an aircraft and consisting of a dome-shaped cover made of composite materials reinforced with fibers, preferably in one single piece, and cover reinforcing devices connected to said cover or produced integrally therewith.

2. Description of the Related Art

For economic reasons, the flight altitude of passenger aircraft is chosen as high as possible, because in higher altitudes there is less air resistance, resulting in less fuel consumption. Common flight altitudes are in the range of 10,000 to 12,000 m (32,808 to 39,370 ft.). Such altitudes, however, are not appropriate for humans, because atmospheric pressure is low, the air does not contain much oxygen, and the air temperature is low. Therefore, the conditions inside the fuselage of an aircraft must be adapted to the living conditions humans are used to. This is done by creating a cabin atmosphere corresponding to an altitude of about 3000 m (9842 ft.). Because the difference in pressure between the inside of the aircraft and its environment corresponds to a difference in altitude of about 7000 to 9000 m (22,966 to 29,527 ft.), the interior of the aircraft must be designed as a pressure chamber which is able to withstand such pressure differences. For this purpose there are so-called pressure frames at the front and rear ends of the fuselage, which are designed to withstand these strains.

The rear pressure frame is usually in the form of a dome-shaped cover, with the concave side facing the aircraft cabin. Known pressure frames consist of a plurality of reinforcing profiles distributed in radial direction and in the direction of concentric circles and are connected to each other e.g. by means of rivets. The skeleton thus formed is covered with overlapping metal parts which are attached to each other and to said reinforcing elements. Therefore, the production of such pressure frames is considerably complicated and costly. If said metal cover starts cracking, there is the risk that the crack will develop further so that the pressure frame will break and pressure will escape from the passenger cabin to the rear, which may lead to a crash of the aircraft. Therefore, in order to make the aircraft as safe as possible, it must be made sure that, if a crack develops, it is prevented from developing further so that pressure can not drop suddenly or like in an explosion. This aim is reached by keeping the sheet metal areas without reinforcing profiles as small as possible; in addition, e.g. crack stoppers made of titanium sheets have to be installed, which makes production even more complicated. In aircraft for several hundred passengers, the rear pressure frame is about 3.5 to 4 m (11.5 to 13,1 ft.) in diameter. Such dimensions result in a relatively high weight of about 100 kg (220 pounds), which has a particularly negative effect because it is far away from the center of gravity of the aircraft.

From EP 387 400 B1 a pressure frame made of composite materials reinforced with fibers for the pressure fuselage of an aircraft is known, which is as light-weight as possible, cheap to produce and easy to install. In order to reach these aims, said pressure frame has a non-uniform fiber layer structure which is more rigid at the periphery than in the center. The periphery of the dome-shaped cover is formed such that it will adapt to the cross-section of the fuselage and is easy to install, e.g. by gluing or riveting. This eliminates the need for an additional frame to install the pressure frame in the aircraft fuselage. The data of the embodiment described show that said pressure frame is intended for relatively small aircraft. In larger aircraft for several hundred passengers some enormous aerodynamic forces act on the sides of the pressure frame, e.g. from the rudder unit forces or thrusts of the power units. In large aircraft the pressure frame is about 3.5 to 4 m (11.5 to 13,1 ft.) in diameter. Such dimensions result in an increased risk of the cover being turned inside out towards the aircraft cabin, i.e. in the direction of the concave side of the cover, if the pressure difference between the cabin and the environment is suddenly reversed. Such reversion of pressure difference may e.g. happen if the aircraft is sinking quickly.

SUMMARY OF THE INVENTION

Therefore, the aim of the invention is to provide a pressure frame designed in particular for aircraft; which is as light-weight as possible, may be produced as quickly and cheaply as possible and still meets the strain requirements, particularly for large aircraft. In addition, the risk of destroying the pressure frame by the cover being turned inside out towards the inside of the aircraft is to be reduced. The disadvantages of known pressure frames are to be avoided or at least reduced.

The aim of the present invention is reached by providing a cover of essentially uniform thickness and mounting at least one cover reinforcing device in the central area of the concave side of the cover. Particularly in large aircraft it is necessary and useful to disconnect the cover of the pressure frame from the structure frame, which e.g. has to absorb rudder unit forces or power unit thrusts, by means of a "resiliently bending" peripheral connection so that any side forces can not negatively affect the cover. Therefore, it is useful to attach the cover to the fuselage via a stable profile, which is why said cover need not be more rigid or thicker at the periphery. This, in turn, results in less material being necessary, which means that the structure will have less weight. The term "essentially the same thickness" is meant to include optionally thicker edges around openings or holes in the cover which serve to reinforce these weak points of the cover. The cover reinforcing device provided in the central area of the cover, which device is mounted on the cover on its concave side and is connected to the cover or produced integrally therewith, results in considerably improved stability, because if the pressure difference is reversed, bulging areas will be considerably smaller, thus keeping the cover from being completely turned inside out towards the inside and thus from being destroyed. Appropriate construction of said cover reinforcing device in the central area of the cover allows further reduction in thickness of the cover material without the pressure frame falling short of security requirements.

According to another feature of the invention, said cover reinforcing device located in the central area is formed by a reinforcing structure oriented against the curvature of the cover, for example a truncated cone-shaped, mug-shaped or parabolic structure, with a cavity being arranged between the cover and the reinforcing structure. This provides optimum rigidity, particularly in the central area of the cover, thus reducing the probability of the cover being turned inside out.

Checking the cover of a pressure frame is one of the regular tasks of aircraft inspection. Therefore, according to another feature of the invention, inspection openings for the inspection of the cover part behind the reinforcing structure are arranged in the reinforcing structure in the central area of the cover. These openings will also save material and thus weight. Care must be taken, however, so as that said openings do not substantially reduce the stability of the structure.

Moreover, reinforcing profiles are mounted on the concave side of the cover, particularly in radial direction, which profiles are connected to the cover or produced integrally therewith.

Apart from any connecting elements between the cover and the reinforcing devices or the fuselage, the pressure frame is solely made of plastic material reinforced with fibers. Fiber materials are glass, carbon or aramide (aromatic polyamides). As plastic material, preferably duroplast or thermoplast are used. Fabric is highly tear-resistant and tear-tolerant compared to metal and therefore allows a thinner and thus lighter structure.

BRIEF DESCRIPTION OF THE DRAWINGS

Further features of the invention will be explained in greater detail with reference to the attached drawings, wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
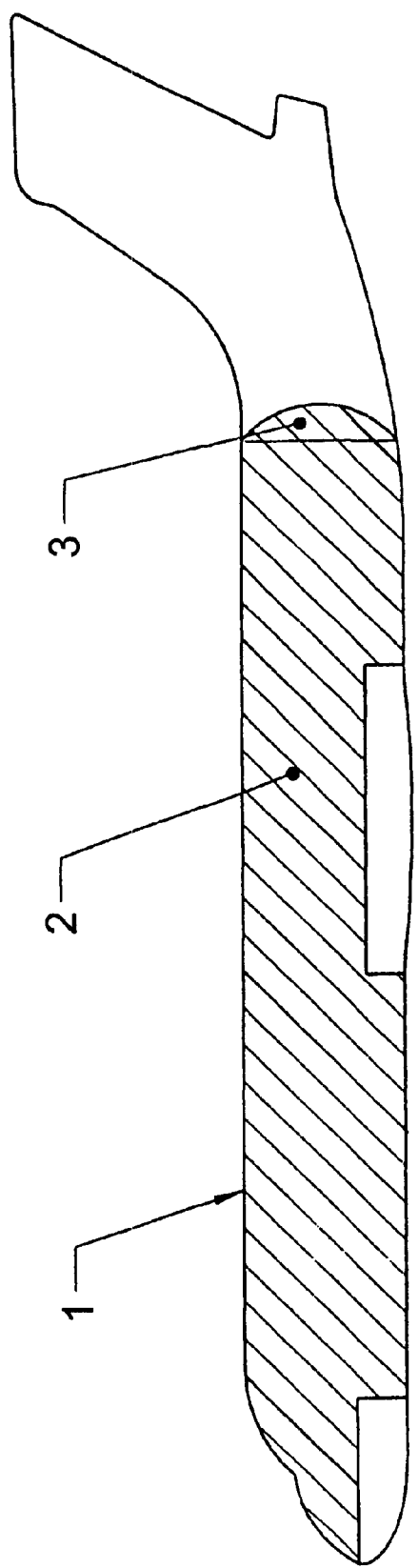
FIG. 1 shows a schematic longitudinal section of an aircraft fuselage.

FIG. 1 is a schematic representation of a fuselage 1 in the longitudinal direction of the aircraft. The inner compartment 2 of the aircraft, which is designed as a pressure chamber, is hatched. The pressure frame 3 is located at the rear end of the inner compartment 2 of the aircraft. Said frame has the form of a dome-shaped cover, with the concave side being oriented towards the inside 2 of the aircraft and usually being provided with reinforcements (not shown) which keep the cover from turning inside out towards the inside 2 of the aircraft. The pressure frame 3 is securely and tightly connected to the fuselage 1. The shape of the cover is adapted to the cross-section of the fuselage 2 and may therefore be of round, elliptical or another shape. Depending on the application, the curvature of the cover of the pressure frame 3 may be of circular, parabolic, hyperbolic or another shape.

Figure 2:
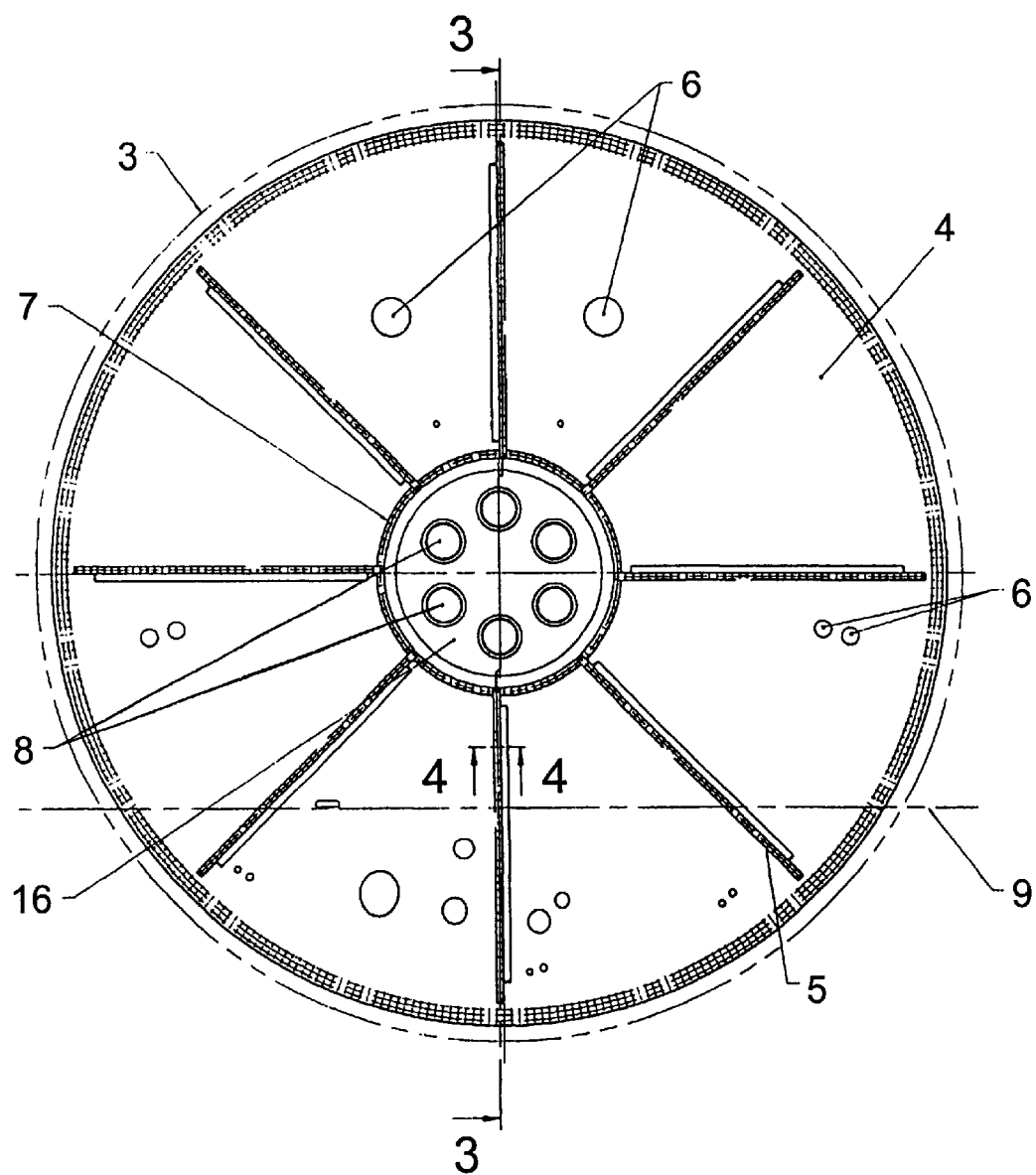
FIG. 2 shows an embodiment of the pressure frame as seen from inside the aircraft looking in the direction opposite the flight direction.

FIG. 2 shows an embodiment of a pressure frame 3 according to the present invention as seen from inside the aircraft looking in the direction opposite the flight direction.

The pressure frame 3 consists of a cover 4 made of one single piece. However, if necessary for production reasons, said cover 4 may e.g. also be made of several pieces. In order to reinforce said cover 4, a reinforcing structure 7 is provided on the concave side of said cover 4 concentrically around the center, and it is connected to said cover 4 or produced integrally therewith. In the example shown, said reinforcing structure has the shape of a truncated cone, but other constructions oriented against the curvature of said cover 4 may be provided as well, such as e.g. a parabolic or mug-shaped structure. The bottom 16 of said truncated cone-shaped reinforcing structure 7 has inspection openings 8 provided for the inspection of the part of cover 4 lying behind them. This is necessary because said cover has to be checked regularly. Moreover, said inspection openings 8 help reduce weight without substantially reducing the stability of the structure. Particularly in large aircraft, wherein the cover is up to 3.5 to 4 m (11.5 to 13,1 ft.) in diameter, reinforcing profiles 5 are provided radially on the concave side of cover 4 for further reinforcement, which profiles are connected to said cover 4 or are produced integrally therewith. The reinforcing structure 7 and the reinforcing profiles 5 are also made of plastic material reinforced with fibers, like said cover 4. Said cover 4 has various openings 6 to make room for electric wires, hydraulic or fuel lines and pressure compensation valves. For reinforcement, said cover 4 may be thicker in the region of such openings 6, so that the development of cracks from an opening 6 can largely be avoided. Apart from that, said cover 4 is of essentially uniform thickness, which is an advantage in production. The size and shape of the central reinforcing structure 7 is chosen as desired depending on application requirements, but said openings 6 in said cover 4 must be taken into account. Instead of a round shape, said reinforcing structure 7 may also be of polygonal shape. In the drawing, the floor level 9 of the aircraft cabin is indicated by a dashed line.

Figure 3:
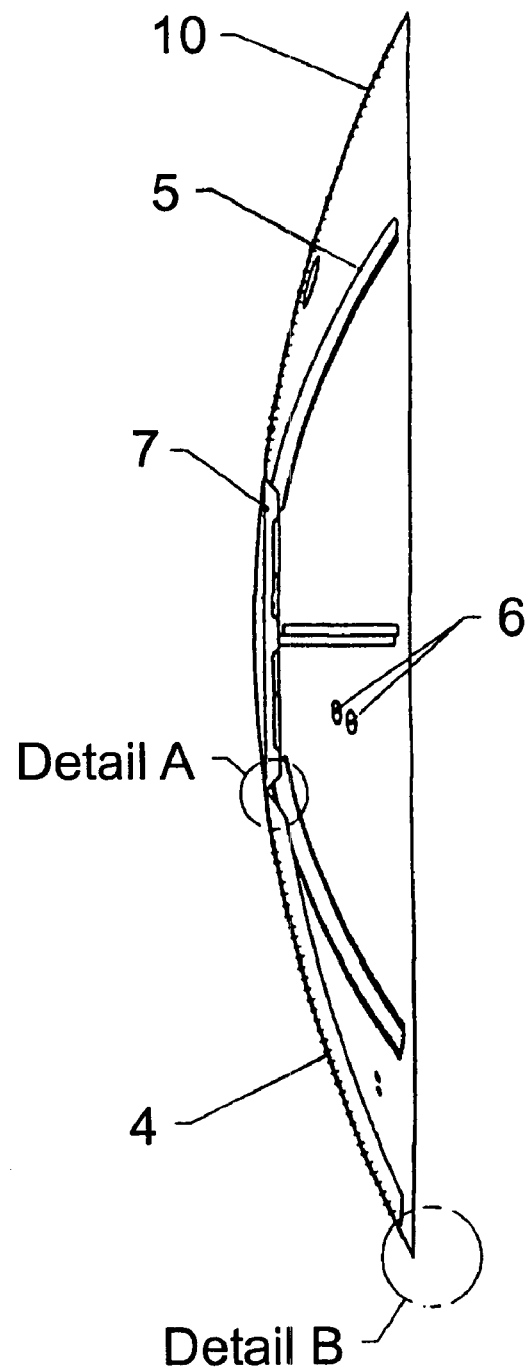
FIG. 3 shows a section of the pressure frame according to FIG. 2 along the line III—III.

FIG. 3 shows the section along the line III—III in FIG. 2. The radial lines on the cover 4 indicate the connections 10 of the reinforcing profiles 5 with said cover 4. The reinforcing structure 7 and the reinforcing profiles 5 prevent said cover 4 from turning inside out towards the inside of the aircraft. This figure shows better that the central reinforcing structure 7 has the shape of a truncated cone. Other constructions may be provided as well, such as e.g. a structure like a dome-shaped cover whose curvature is oriented against the curvature of said cover 4 and which structure is connected to said cover 4. Said reinforcing profiles 5 are preferably arranged radially on said cover 4, but it is also possible to arrange said reinforcing profiles 5 at an angle with respect to the radial direction and, in addition, tangentially.

Figure 4:
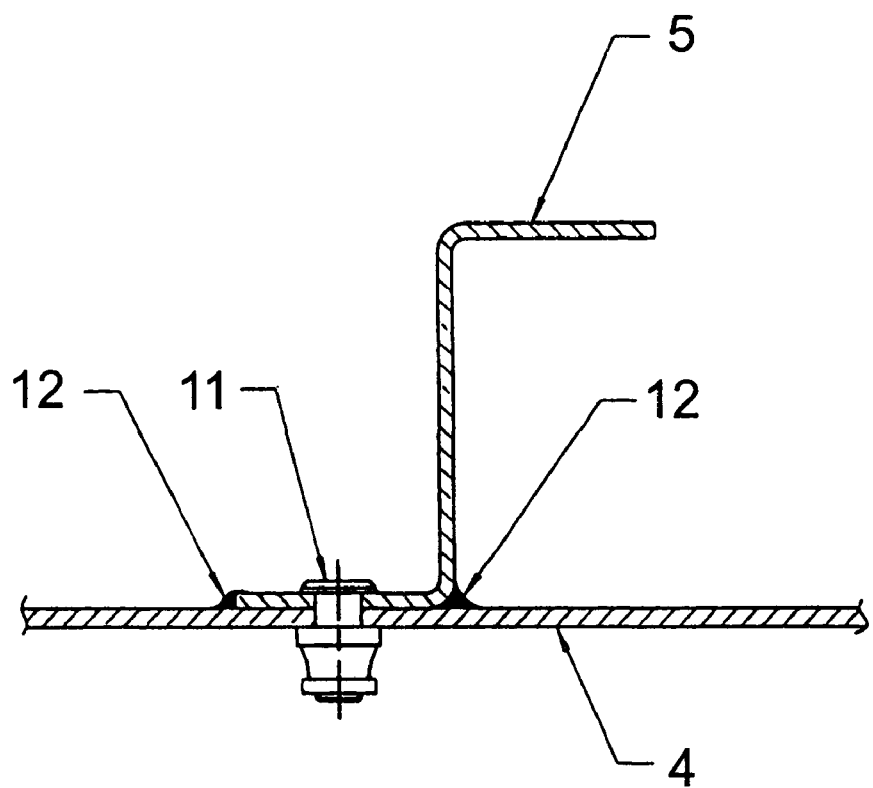
FIG. 4 shows a section along the line IV—IV in FIG. 2 in greater detail.

In FIG. 4, which shows the section along the line IV—IV in FIG. 2 in greater detail, a reinforcing profile 5 and its connection to the cover 4 are represented. In this embodiment, the radially arranged reinforcing profile 5 has a Z-shaped cross-section, with one leg of said reinforcing profile 5 being connected to said cover 4 via a threaded rivet 11. Said threaded rivet 11 may e.g. be made of titanium. This screw joint is advantageously sealed, for which purpose the rivet is "set wet", i.e. it is provided with sealing material and then screwed in. For further sealing, a seal 12 is provided between said reinforcing profile 5 and said cover 4 at the point of connection. Said seal 12 may be made of polysulfide based sealing material usually used for the construction of aircraft, which has the form of a paste and exhibits permanently resilient behavior. However, said cover 4 and said reinforcing profile 5 may also be connected in other ways, e.g. by gluing.

Figure 5:
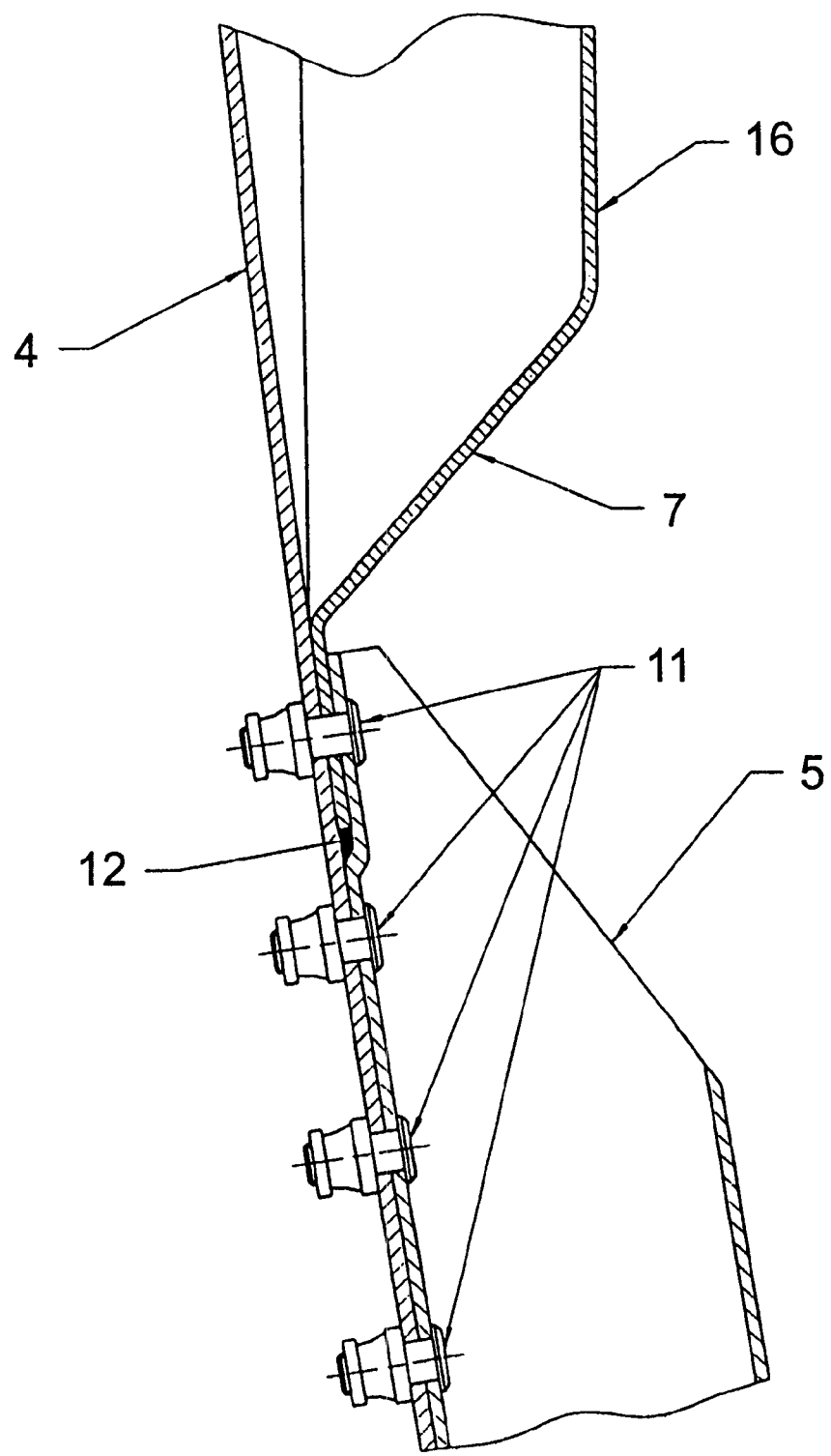
FIG. 5 shows detail A of FIG. 3, enlarged.

FIG. 5, which shows detail A of FIG. 3, represents the connection of the reinforcing structure 7 to the cover 4. For this purpose, the edge of the truncated cone-shaped reinforcing structure 7 is connected to the cover 4 by means of a threaded rivet 11. In addition, part of a radial reinforcing profile 5 overlaps the region at the edge of said reinforcing structure 7 and is also connected to said cover 4 by means of said threaded rivet 11. Further threaded rivets 11 serve to connect the radially arranged reinforcing profile 5 with said cover 4. Any gaps are provided with a seal 12, which usually is in the form of a sealing material.

Figure 6:
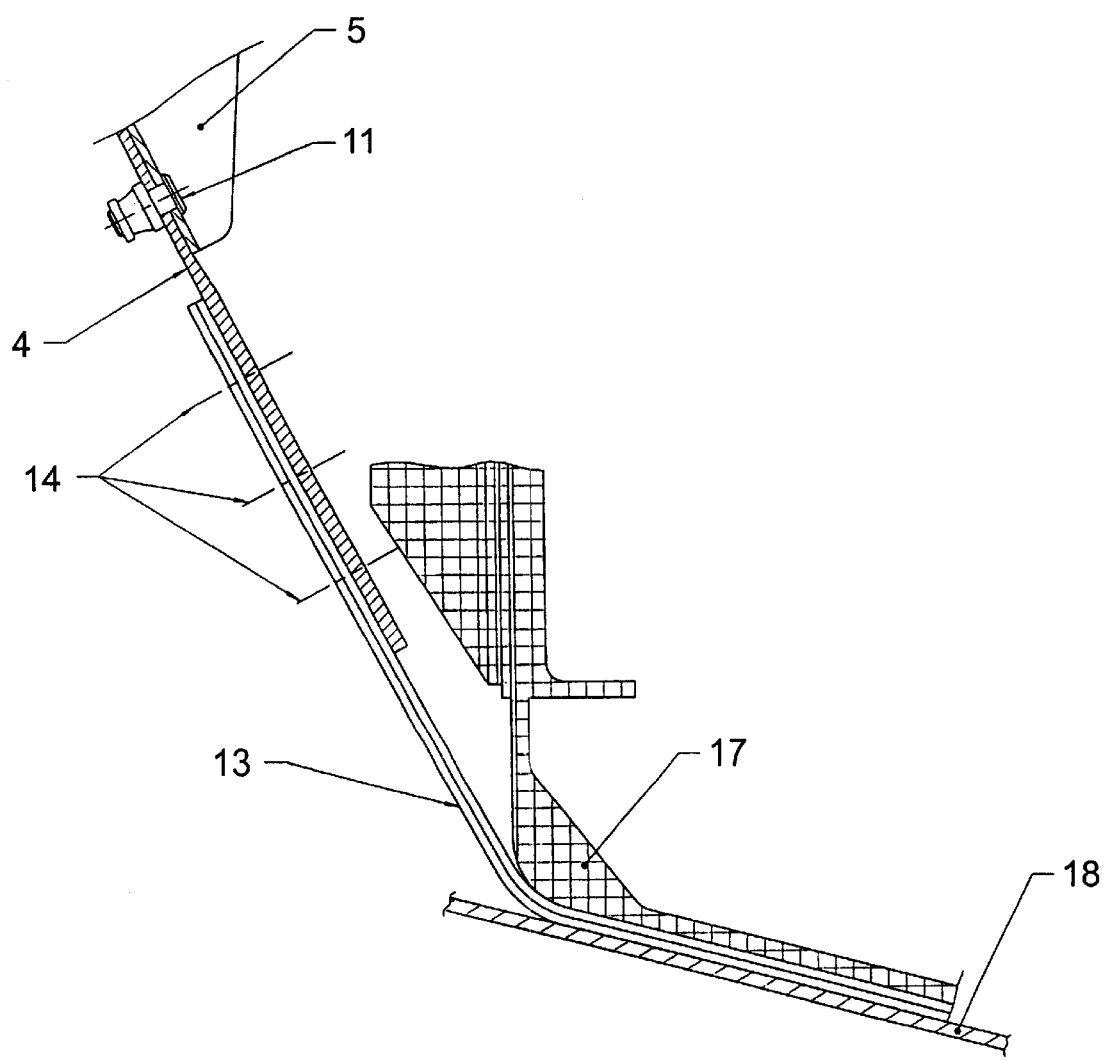
FIG. 6 shows detail B of FIG. 3, enlarged.

Detail B of FIG. 3 is enlarged in FIG. 6, wherein the connection between the pressure frame 3 and the fuselage is indicated. They are connected via a connecting knee 13, which is securely and tightly connected to the outer edge of the cover 4 via connecting elements 14. Said connecting knee 13 may e.g. be made of titanium and is a relatively resilient connection when bended. The structure frame 17, which is connected to the aircraft planking 18 and said connecting knee 13, absorbs side forces, e.g. originating from the rudder units or power unit thrusts, and thus prevents these forces from straining said pressure frame 3. This disconnection of the cover 4 of said pressure frame 3 from said structure frame 17 of the fuselage is particularly important in large aircraft. Said cover 4 only has to seal the inside of the aircraft and need not absorb the external forces from the sides as well, which are absorbed by said structure frame 17 itself. An insulating layer, e.g. a layer of glass or epoxy, may be provided between said pressure frame 3 and said connection to the fuselage. This prevents electrochemical corrosion of the connecting elements by electrolysis due to the electric conduction. Moreover, said cover 4 is usually provided with ground points to ground said pressure frame 3.

Figure 7:
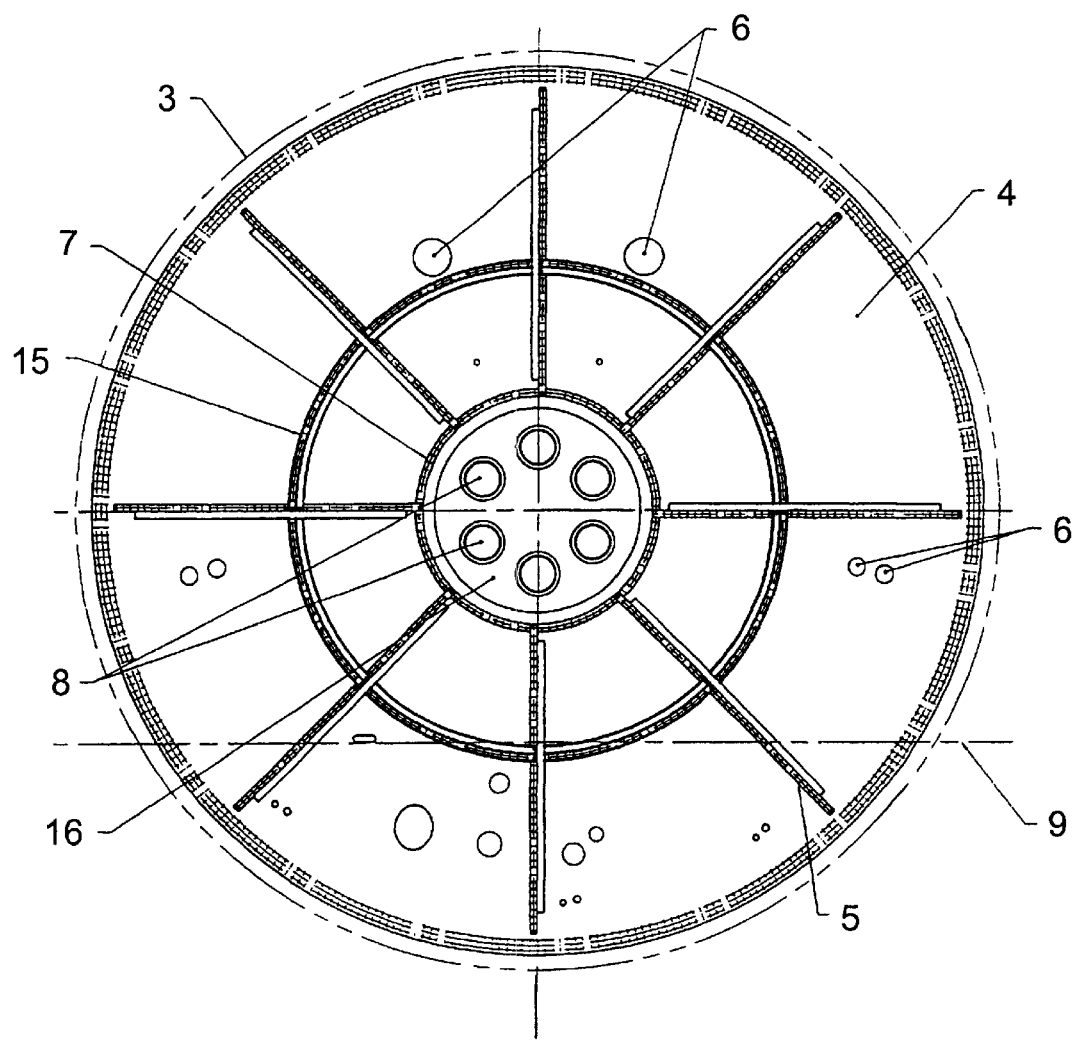
FIG. 7 shows another embodiment of a pressure frame as seen from inside the aircraft looking in the direction opposite the flight direction.

FIG. 7 shows an embodiment of a pressure frame according to the present invention, wherein further reinforcing profiles 15 are provided along a concentric circle in addition to the reinforcing structure 7 in the central area of the cover and the radial reinforcing profiles 5. An increase in the number of reinforcing profiles makes the areas of the cover 4 behind them smaller and thus increases the stability of the structure. In addition, the more complex reinforcing structures 5, 7, 15 help further reduce the thickness of said cover 4, thus saving material and weight. Instead of the circular reinforcing profiles 15, straight reinforcing profiles forming a polygon are also possible, of course.

Advantageously the pressure frame 3 according to the present invention is prepared such that the cover 4 together with the reinforcing structure 7 and the reinforcing profiles 5, 15 are produced in one piece in one step. The so-called resin transfer molding (RTM) technology has advantages over the conventional production process using an autoclave wherein the prepreg material is cured. According to the RTM process, the dry fibers are introduced into a mold corresponding to the shape of the object to be produced, and then a special resin having relatively low viscosity is pressed into the closed mold, optionally under the action of a vacuum. The mold is heated in order to further reduce the viscosity of the resin and to provide an undisturbed flow in the mold. Then the resin impregnating the fibers hardens. According to the RTM process, more complicated objects may be produced easily, quickly and relatively cheaply. Therefore, in the present case, said cover 4 of said pressure frame 3 together with all reinforcing structures 5, 7, and 15 may be produced in one step. This means that no additional time is required to connect said cover 4 to said reinforcing devices 5, 7, 15, and the tightness of said pressure frame 3 is increased.

Of course, it is possible to apply the present pressure frame to other types of aircraft or comparable objects wherein a difference in pressure between the inside and the environment must be maintained for sure.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A pressure frame designed for an aircraft comprising a dome-shaped cover made of composite materials reinforced with fibers, and at least one cover reinforcing structure connected to said cover or produced integrally therewith, said cover being of essentially uniform thickness, and said at least one cover reinforcing structure being mounted in a central area to the concave side of said cover proximate a vertex of said dome-shaped cover and being oriented against the curvature of said cover such that a cavity exists between said cover and said reinforcing structure, with a periphery of said cavity being substantially defined by a circumference of said reinforcing structure.

2. The pressure frame according to claim 1, wherein inspection openings are provided in said reinforcing structure in the central area of said cover for inspection of a part of said cover lying behind said reinforcing structure.

3. The pressure frame according to claim 1, wherein reinforcing profiles are mounted on the concave side of said cover and are connected to said cover or are produced integrally therewith.

4. The pressure frame according to claim 1, wherein said reinforcing structure has a truncated cone-shaped, mug-shaped or parabolic structure.

5. The pressure frame according to claim 1, wherein said dome-shaped cover is made in one piece.

6. The pressure frame according to claim 3, wherein said reinforcing profiles run in a radial direction.

7. A pressure frame for an aircraft comprising:
    a dome-shaped cover made of composite materials reinforced with fibers and being of essentially uniform thickness, said dome-shaped cover defining a vertex; and
    a cover reinforcing structure integrally formed with said cover on the concave side thereof proximate said vertex and oriented against a curvature of said cover.

8. The pressure frame according to claim 7, wherein said cover reinforcing structure is a truncated cone-shaped, mug-shaped or parabolic structure.

9. The pressure frame according to claim 7, wherein inspection openings are provided in said cover reinforcing structure for inspection of a part of said cover lying behind said cover reinforcing structure.

10. The pressure frame according to claim 7, further comprising reinforcing profiles mounted on the concave side of said cover and extending radially from said cover reinforcing structure.

11. The pressure frame according to claim 7, wherein said dome-shaped cover is made in one piece.

12. The pressure frame according to claim 8, wherein said dome-shaped cover is made in one piece.

13. The pressure frame according to claim 8, wherein a cavity is arranged between said cover and said cover reinforcing structure.

14. A pressure frame for an aircraft comprising:
    a dome-shaped cover made of composite materials reinforced with fibers and being of essentially uniform thickness and in one single piece, said dome-shaped cover defining a vertex; and a cover reinforcing structure mounted axially to the concave side of said cover proximate-said vertex, with a cavity being arranged between said cover and said reinforcing structure.

15. The pressure frame according to claim 14, wherein said cover reinforcing structure is a truncated cone-shaped, mug-shaped or parabolic structure.

16. The pressure frame according to claim 14, wherein inspection openings are provided in said cover reinforcing structure for inspection of a part of said cover lying behind said cover reinforcing structure.

17. The pressure frame according to claim 14, further comprising reinforcing profiles mounted on the concave side of said cover and extending radially from said cover reinforcing structure.

* * * * *